US012649330B2

(12) United States Patent
De Caria

(10) Patent No.: US 12,649,330 B2
(45) Date of Patent: Jun. 9, 2026

(54) THERMAL DEVELOPMENT APPARATUS OF FLEXOGRAPHIC PLATES

(71) Applicant: Vianord Engineering Sasu, Carros (FR)

(72) Inventor: Riccardo De Caria, Carros (FR)

(73) Assignee: Vianord Engineering Sasu, Carros (FR)

( * ) Notice: Subject to any disclaimer, the term of this patent is extended or adjusted under 35 U.S.C. 154(b) by 144 days.

(21) Appl. No.: 18/795,249

(22) Filed: Aug. 6, 2024

(65) Prior Publication Data

US 2024/0391268 A1 Nov. 28, 2024

(30) Foreign Application Priority Data

Aug. 7, 2023 (IT) ........................ 102023000016842

(51) Int. Cl.
*B41N 3/00* (2006.01)
*B41C 1/18* (2006.01)
*B41N 1/16* (2006.01)

(52) U.S. Cl.
CPC ................ *B41N 3/006* (2013.01); *B41C 1/18* (2013.01); *B41N 1/16* (2013.01)

(58) Field of Classification Search
CPC .............. B41N 3/006; B41N 1/16; B41C 1/18
See application file for complete search history.

(56) References Cited

U.S. PATENT DOCUMENTS 6,797,454 B1 * 9/2004 Johnson .................... G03F 7/36 101/463.1
11,325,369 B2 * 5/2022 Markhart .................. G03F 7/36
2005/0142494 A1 6/2005 Hackler et al.
2005/0241509 A1 * 11/2005 Gotsick ..................... B41C 1/02 101/401.1

(Continued)

FOREIGN PATENT DOCUMENTS

JP 2005292761 A 10/2005

OTHER PUBLICATIONS

Italian search report for corresponding application No. IT202300016842, Feb. 20, 2024, 7 pages.

*Primary Examiner* — David H Banh
(74) *Attorney, Agent, or Firm* — Patterson Intellectual Property Law, PC

(57) ABSTRACT

A thermal development apparatus for removing non-crosslinked polymer or monomer from a first surface of a flexographic plate comprises a moving assembly which moves the plate along a predetermined trajectory. A development operating assembly applies an absorbent material to the first surface during movement thereof, and comprises feeding means of the absorbent material and heating means for heating the first surface to a temperature sufficient to melt at least a portion of the non-crosslinked polymer/monomer. A second operating assembly comprises contact means configured to cause a contact between the absorbent material and the first surface to allow the melted polymer/monomer to be absorbed by the absorbent material. A cooling assem- (Continued)

bly cools the plate at an operating position downstream of the operating position at which the absorbent material contacts the first surface, wherein the operating positions are considered with respect to the predetermined trajectory along which the plate is moved.

10 Claims, 6 Drawing Sheets

(56) References Cited

U.S. PATENT DOCUMENTS

| | | | | |
|---|---|---|---|---|
| 2006/0105109 | A1* | 5/2006 | Gotsick | B41C 1/00 118/46 |
| 2007/0051262 | A1* | 3/2007 | Gotsick | B41C 1/055 101/401.1 |
| 2009/0199733 | A1 | 8/2009 | Dudek et al. | |
| 2009/0235835 | A1* | 9/2009 | Hull | G03F 7/34 101/401.1 |
| 2010/0242761 | A1 | 9/2010 | Hackler et al. | |
| 2012/0067235 | A1* | 3/2012 | Odle | B41N 6/00 101/486 |
| 2013/0108966 | A1 | 5/2013 | Arnold et al. | |
| 2015/0219995 | A1 | 8/2015 | Arnold | |
| 2017/0051262 | A1 | 2/2017 | Harris et al. | |
| 2017/0173937 | A1 | 6/2017 | Arnold et al. | |

* cited by examiner

THERMAL DEVELOPMENT APPARATUS OF FLEXOGRAPHIC PLATES

CROSS-REFERENCES TO RELATED APPLICATIONS

This application claims right of priority to Italian Patent Application No. 102023000016842, filed on Aug. 7, 2023, and which is hereby incorporated by reference in its entirety.

FIELD OF THE INVENTION

The present invention falls within the field of the manufacture of systems for preparing digital flexographic printing plates. In particular, the present invention relates to a thermal development apparatus of a flexographic plate.

BACKGROUND

Flexography is a direct rotary printing method that uses relief plates made of photopolymer materials. The plates are flexible and soft, hence the name flexography. These plates are inked and the print is obtained by direct deposition of the ink on the medium to be printed due to a light pressure applied by a printing cylinder on which the plates are positioned.

Flexography is a high-speed printing process capable of printing on many types of absorbent and non-absorbent materials. Some typical applications of flexographic printing are the production of paper and plastic bags, milk cartons, disposable cups, and the like; however, thanks to current advances in print quality, flexographic printing is also used, for example, to print newspapers, envelopes, labels, and to print on plastic, acetate films and sheets, wrapping paper and various materials used for product packaging.

A particular flexographic printing process is “digital flexography”, in which digital plates (or “flexographic plates”) are used. In these plates, the photopolymer is originally covered with a surface layer of a material that prevents photo-exposure, such as, for example, a layer of carbon or graphite. This layer of material is etched to create the negative image of the print subject. This etching step is typically carried out using a digital laser controlled by a computer (hence the acronym CTP “computer to plate” used in the field to indicate this step of the pre-printing process). The plate is then photo-exposed and the material not exposed to light is eliminated during an operation known as “development of the flexographic plate”.

According to a first known method, the development of a digital plate takes place through a washing operation which involves the use of a liquid (water- or solvent-based) intended to dissolve and/or soften the polymer or monomer previously not exposed to light. In presence of this liquid, the plate is subjected to the mechanical action of brushes that act on the surface of the plate to facilitate detachment of the monomer or polymer not exposed to light.

According to a second known method, alternative to washing, flexographic plates are thermally developed through a process that removes the polymer or monomer not exposed to light through contact with absorbent material, wherein this contact takes place when the unexposed polymer or monomer is brought to a temperature that melts it so that it flows into the absorbent material and hence so that it can be removed in contact with this material. Compared to the washing method, thermal development of the plates is a substantially “dry” method and hence does not require a drying time downstream of the development operation, the time being instead required by the development process involving washing with a liquid.

In recent years, different apparatus for the thermal development of flexographic plates have been proposed. Examples of these apparatus are disclosed, for example, in EP1526410, EP2774003, EP1850183, and EP1553456.

In general, a thermal development apparatus of a flexographic plate comprises a moving assembly that supports the flexographic plate and moves the same along a predetermined trajectory. In a first known embodiment, for example shown in WO2022026980, EP2501550, or EP3033236, the moving assembly has a conveyor configuration comprising two rollers (at least one of which is motorized) and a belt wound around the two rollers and moved thereby. The flexographic plate is positioned on this belt. Rotation of the two rollers causes movement of the belt, and hence of the flexographic plate integral therewith.

In an alternative embodiment, shown for example in EP1624343 or EP1899766, the moving assembly is provided with a single motorized cylinder on the surface of which the plate is positioned. In use, the cylinder is rotated about its longitudinal axis and the plate carries out corresponding rotations about the axis of the cylinder.

In any case, the moving assembly defines a moving support surface on which the flexographic plate is positioned. More precisely, the plate rests on this moving surface with a base surface (or inner surface) thereof opposite the outer surface previously exposed to light and hence requiring thermal development.

To allow positioning of the plate on the moving assembly, a series of holes is first made in the plate, close to an edge thereof, wherein these holes allow a plate to be connected to a pin bar (i.e., a bar provided with a row of projecting pins). This pin bar is fixed to the surface of the belt or to the motorized cylinder, depending on the configuration of the moving assembly.

In addition to a moving assembly, a thermal development apparatus comprises a development operating assembly to apply, during movement of the plate, the absorbent material to the outer surface of the plate, i.e., to develop the plate. Typically, a development operating assembly comprises heating means to bring the outer surface of the plate to a temperature sufficient to melt/liquefy the polymer and hence to allow its removal through contact with the absorbent material. For this purpose, the development operating assembly comprises feeding means of the absorbent material and contact means acting on the absorbent material to make it adhere to the outer surface of the plate so as to absorb, and hence remove, the non-crosslinked polymer/monomer.

Typically, the feeding means comprise a plurality of rollers/cylinders that configure a path for the absorbent material between a first roller, from which the absorbent material is unwound, and a last roller on which the material is rewound after contacting the outer surface of the plate. Usually, tensioning rollers/cylinders are provided to maintain the correct feed tension of the absorbent material. The contact means act on the absorbent material at a predetermined point of its path causing it to adhere to the outer surface of the plate.

The heating means are operatively positioned upstream of, or at, the contact means so as to heat the outer surface of the plate before or during the action of the contact means. In particular, a first known embodiment, for example shown in EP1740392, provides for the use of a heating cylinder on a portion of which the absorbent material is conveyed. The heating cylinder obviously acts as heating medium, while the contact means comprise a pushing unit acting on the heating cylinder to convey the absorbent material onto the outer surface of the plate. The heating cylinder is typically made of metal material and heated by means of at least one electrical resistor. Therefore, in this solution, advantageously, the plate is heated simultaneously to the removal of the non-crosslinked polymer/monomer by means of the absorbent material.

From an operational viewpoint, during the development process the plate is moved several times along the path/trajectory defined by the moving assembly and thus comes into contact several times with fresh absorbent material supplied by the feeding means. In the case in which movement of the plate is implemented by means of a motorized cylinder and in which a heating cylinder is used (according to the solution described above), during the process the plate is subjected to subsequent rotations, thus coming into contact, at each rotation, with the heating roller until complete removal of the non-crosslinked polymer/monomer, i.e., until complete development of the plate.

The Applicant has observed that if on the one hand the presence of the heating means, regardless of their possible configuration, is essential for the process to remove the polymer or monomer, on the other hand this heating can cause distortion/deformation of the structure of the base film of the plate, typically made of Mylar. Such condition can compromise the quality and in fact the use of the flexographic plate for printing operations. More precisely, a distortion/deformation can make it difficult or even impossible to carry out the "registration" operation, performed before printing with the flexographic plate. In practice, a modification of the structure of the base layer of the plate can make it impossible to obtain the correct "CMYK colour model", which is necessary to obtain a qualitatively satisfactory printing. When this condition occurs, the flexographic plate is in fact unusable and must be discarded.

The Applicant has therefore observed that there is a need to provide a new technical solution that allows the quality of thermally developed flexographic plates to be improved so as to reduce the number of discarded plates due to the aforementioned problem.

BRIEF SUMMARY

A thermal development apparatus of a flexographic plate is disclosed herein that allows the aforementioned problem to be solved or limited. Within this aim, an object may be to provide a thermal development apparatus that makes it possible to prevent distortion/deformation of the base film of the flexographic plate due to heating thereof. Another object, linked to the previous one, may be to prevent the deformation of the base film without reducing the heating temperature required to melt the material and/or without increasing the process times of the plate. One more object may be to provide a thermal development apparatus of a plate that is reliable and easy to produce at competitive costs.

The Applicant has observed that this aim and these objects can be achieved by providing in the apparatus a cooling assembly of the flexographic plate operatively arranged downstream of the contact means with respect to the moving path of the flexographic plate. More precisely, this cooling assembly acts on the flexographic plate by cooling it, preferably through contact with one or more cold surfaces, wherein this contact takes place after the plate has been heated for removal of the non-crosslinked polymer/monomer. In practice, for each movement cycle of the plate along the path defined by the moving assembly, the plate is first heated by the heating means of the development operating assembly and subsequently cooled by means of the cooling assembly.

In an embodiment, the aim and the objects may be achieved by means of a thermal development apparatus of a flexographic plate, particularly for removing non-crosslinked polymer or monomer from a first surface of the plate. The apparatus according to such an embodiment may comprise:

- a moving assembly defining a support surface for a second surface of the flexographic plate opposite the first surface, wherein this moving assembly moves the flexographic plate along a predetermined trajectory;
- a development operating assembly for applying an absorbent material to the first surface of the flexographic plate during the movement thereof, wherein the development operating assembly comprises:
- feeding means of the absorbent material;
- heating means for heating the first surface of the flexographic plate to a temperature sufficient to melt at least a portion of the non-crosslinked polymer/monomer;
- contact means configured to cause a contact between the absorbent material and the first surface of the flexographic plate to allow the melted polymer/monomer to be absorbed by the absorbent material.

The apparatus may according to such an embodiment may further comprise a cooling assembly for cooling the flexographic plate at an operating position downstream of the operating position at which the absorbent material contacts the first surface of the flexographic plate, wherein these operating positions are considered with respect to the predetermined trajectory along which the flexographic plate is moved.

According to an embodiment, the cooling assembly comprises at least one cooling element movable between a first reference position and a second reference position, respectively corresponding to a contact and non-contact condition with the first surface of the flexographic plate, wherein the cooling assembly further comprises displacement means for moving, directly or indirectly, the at least one cooling element between the reference positions.

According to an embodiment, the cooling assembly comprises a plurality of cooling cylinders having parallel axes and a support structure that rotatably supports the cooling cylinders; the displacement means are operatively connected to and act on the support structure to move the cooling cylinders between the reference positions.

The cylinders may be cooled by a forced circulation of a cooling fluid therewithin.

According to an embodiment, the moving assembly comprises at least one motorized support cylinder rotatable about a first rotation axis and the support structure is rotatable by means of the displacement means about a second rotation axis parallel to the first rotation axis.

The support cylinder may be supported at its ends by two opposing sidewalls of a support frame that defines a support plane for the apparatus, wherein the support structure comprises a first part and a second part supporting the cooling cylinders near opposite ends thereof; each part is located adjacent to a corresponding one of the sidewalls and the displacement means comprise at least one actuator operatively connected to a corresponding one of the parts of the support structure.

The second rotation axis of the support structure may be arranged at a height lower than the height at which the first rotation axis of the support cylinder is located, wherein these heights are considered with respect to the support plane.

According to a possible embodiment, the cooling assembly further comprises a circulation line for the cooling fluid along which a circulation pump is arranged, wherein the circulation line extends through each of the cooling cylinders.

The cooling assembly may comprise a thermal conditioning machine operatively arranged along the circulation line to condition the cooling fluid before the passage thereof through the cooling cylinders.

In this regard, the cooling fluid may be water and the thermal conditioning machine may be of the water/water type or of the air/water type.

According to a possible embodiment thereof, the support cylinder comprises a cylindrical body and a cover layer that at least partially covers the cylindrical body, wherein the cylindrical body is internally hollow. This configuration of the support cylinder advantageously helps to dissipate heat and hence operates synergically with the cooling assembly to preserve the integrity of the base layer of the flexographic plate.

BRIEF DESCRIPTION OF THE SEVERAL VIEWS OF THE DRAWINGS

Further features and advantages of the present invention will be more apparent from the following detailed description, provided by way of non-limiting example and illustrated in the accompanying drawings, wherein.

The same reference numeral and letters in the figures define the same elements or components.

DETAILED DESCRIPTION

Figure 1:
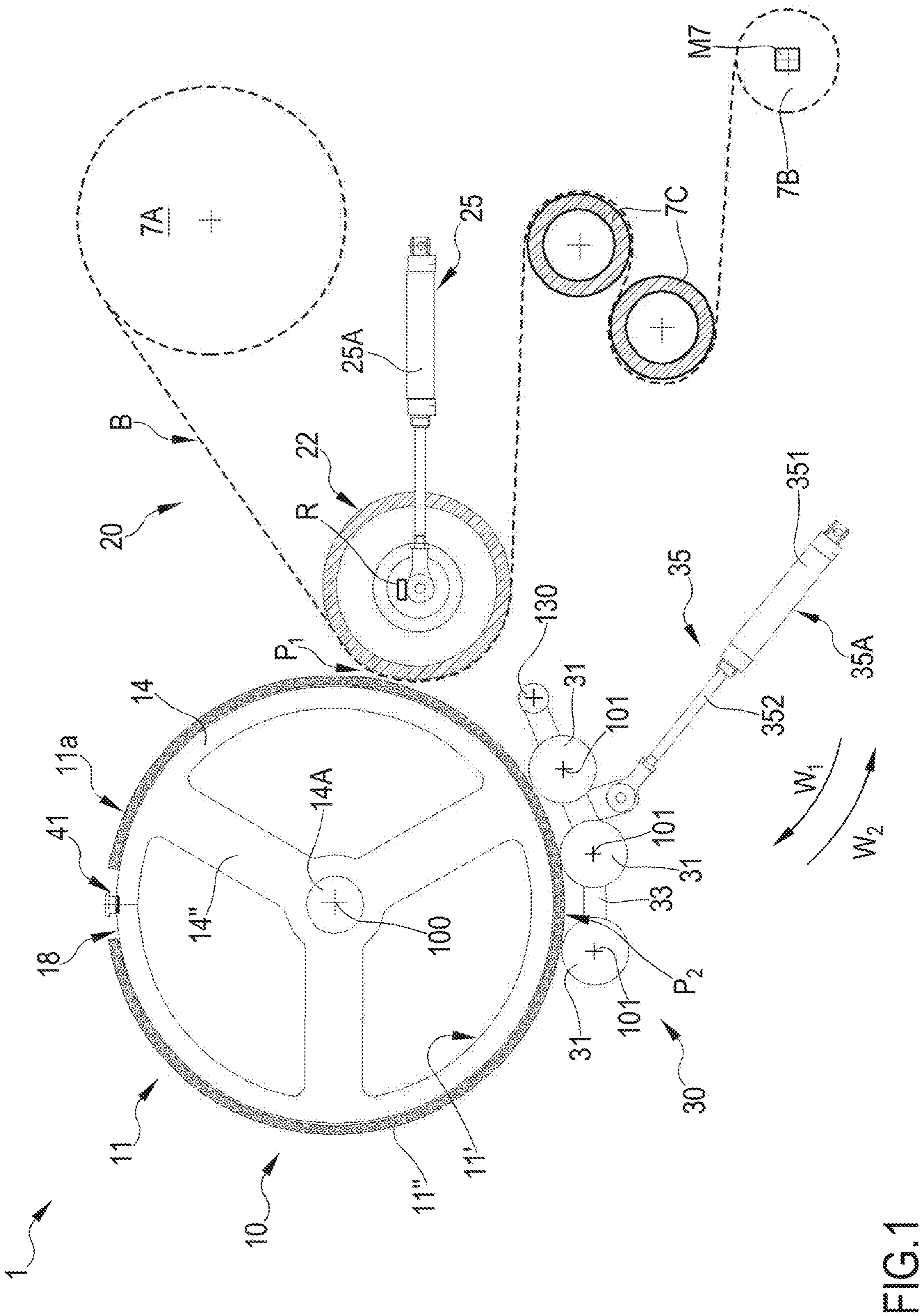
FIG. 1 is a schematic view of a first embodiment of a thermal development apparatus of a flexographic plate according to the invention.

With reference to the aforementioned figures, the present disclosure relates to a thermal development apparatus 1 of a flexographic plate 5 (hereinafter also indicated only as plate 5) shown only in FIG. 4. The plate 5 comprises a first surface 5*a* (or outer surface 5*a*) and a second surface 5*b* (or inner surface 5*b*) defining the “base” layer of the plate 5 which, according to a known solution, can comprise a layer made of Mylar.

One purpose of the apparatus 1 according to the present disclosure may be to allow removal of non-crosslinked polymer or monomer from the first surface 5*a* of the plate 5. The crosslinking process of the polymer or monomer of the plate can take place according to methods known to the person skilled in the art (such as exposure to UV rays). In any case, these methods are not relevant for an invention as disclosed herein unless otherwise expressly noted.

The apparatus 1 comprises a moving assembly 10 for moving the plate 5, which defines a support surface 11*a* for the second surface 5*b* of the plate 5. The moving assembly 10 defines a trajectory along which the plate 5 is moved. As better described below, the moving assembly 10 preferably comprises at least one motorized support cylinder, operated by a motor M, which supports, directly or indirectly, the plate 5.

An apparatus 1 as disclosed herein may comprise a development operating assembly 20 (hereinafter also indicated as operating assembly 20) for applying an absorbent material B (hereinafter also indicated by the term blotter B) to the outer surface 5*a* of the plate 5 during the movement thereof along the trajectory defined by the moving assembly 10. Specifically, this operating assembly 20 comprises feeding means 7A, 7B, 7C having the function of providing the absorbent material B necessary for developing the plate 5. In this regard, the absorbent material B can be of any known type.

The operating assembly 20 further comprises heating means R, 22 for heating the outer surface 5*a* of the plate 5 to a predetermined temperature suitable to cause melting/liquefaction of at least part of the non-crosslinked polymer or monomer. Preferably, this predetermined temperature can vary in a range from 80 to 150° C., depending on the type and/or material forming the plate 5.

The operating assembly 20 further comprises contact means 25-25A configured to make the absorbent material B adhere to the outer surface 5*a* of the plate 5 after or simultaneously to heating of the outer surface 5*a*. For this reason, the heating means R, 22 indicated above are arranged at, or in any case in a position adjacent to, the contact means 25-25A.

In an embodiment as disclosed herein, the apparatus 1 comprises a cooling assembly 30 configured to cool the plate 5 in an operating position (indicated by P2 in FIG. 1) defined downstream of the operating position (indicated by P1 in FIG. 1) at which the absorbent material B contacts the outer surface 5*a* of the plate 5, wherein these operating positions are considered along the predetermined movement trajectory of the plate 5 (not shown in FIG. 1). In other words, in an embodiment, for each rotation of the plate 5, the cooling assembly 30 acts on the plate 5, thereby cooling it, immediately after removal of the polymer/monomer, so as to limit the heat amount in the plate, which would tend to increase due to the action of the heating means of the operating assembly 20. Advantageously, the cooling assembly 30 makes it possible to preserve the integrity of the base film of the plate 5, i.e., to prevent or greatly reduce possible deformations/distortions.

According to an embodiment shown in the figures, the cooling assembly 30 comprises at least one cooling element 31 movable between a first reference position, corresponding to a contact condition with the outer surface 5*a* of the plate 5, and a second reference position, corresponding to a non-contact condition with the outer surface 5*a* of the plate 5.

The cooling assembly 30 further comprises displacement means 35 configured to move, directly or indirectly, the cooling element 31 between the two reference positions indicated above. For the purposes of the present disclosure, the term “cooling element 31” means an element, preferably in form of a cylinder, comprising an exchange surface designed for contact with the outer surface 5*a* of the plate 5, wherein this heat exchange surface is maintained, in use, at a temperature below the temperature reached by the outer surface 5*a* of the plate 5 further to heating by the heating means R, 22, so as to remove heat from the plate.

The figures illustrate an embodiment of the cooling assembly 30 that provides for the use of a plurality of cooling cylinders (indicated by the same reference 31) and a support structure 33 supporting them. The displacement means 35 are operatively connected to and act on the support structure 33 to move the cooling elements 31 between the first reference position and the second reference position defined above. Therefore, in this embodiment, the displacement means 35 move the cooling cylinders 31 indirectly.

In the embodiment illustrated in the figures, three cooling cylinders 31 are provided, but their number could be different, i.e., less than or greater than three. The cooling cylinders 31 are rotatably arranged in the support structure 33, i.e., they can rotate with respect to the structure about a respective longitudinal rotation axis 101. More precisely, during the thermal development of the plate 5, the cooling cylinders 31 are in the first reference position and rotate about their longitudinal axis 101 further to the contact with the outer surface 5*a* of the plate 5.

In the embodiments shown in FIGS. 1 to 5, the moving assembly 10 comprises a motorized support cylinder (hereinafter indicated simply by the term cylinder 11) comprising a cylindrical body 11' whose outer surface is covered by a cover layer 11" made of an elastic material capable of withstanding, without deformation, operating temperatures of about 150° C. Even more preferably, the cover layer 11" is formed of two sub-layers, an internal sub-layer, having a hardness of about 40 Shore, and an external sub-layer having a hardness around 20 Shore. However, the possibility of using cover layers with a different structure also falls within the scope of the invention.

The plate 5 is made integral with the cylinder by the use of connection means, better described below. The plate 5 rests with its inner surface 5*b* on the outer surface 11*a* of the cylinder, i.e., on the outermost surface of the cover layer 11". Therefore, the cylinder 11 defines a substantially cylindrical movement trajectory for the plate 5 integral therewith.

As shown in the figures, the cylindrical body 11' of the cylinder 11, considered on a cross-sectional plane orthogonal to its rotation axis 100, comprises an outermost cylindrical shell 14 connected to a central shaft 14A by longitudinally spaced heads 14' (visible in FIG. 5), wherein these heads 14' comprise connection spokes 14". As a whole, the cylindrical body 11' is internally hollow (see again FIG. 5). Advantageously, this configuration helps to dissipate heat and hence helps to preserve the integrity of the base layer of the plate 5.

The cooling cylinders 31 are oriented so that their rotation axis 101 is parallel to the rotation axis 100 of the cylinder 11 supporting and moving the plate 5. Preferably, the cooling cylinders 31 have a length (i.e., an extension parallel to the rotation axis 101) greater than or equal to the length of the cylinder 11 (parallel to its rotation axis 101). In this way, at the passage of the plate 5, the cooling cylinders 31 can contact the outer surface 5*a* of the plate 5 along its whole width L.

In the embodiments shown in FIGS. 1 to 5, the support structure 33 rotates about a rotation axis 130, further to the action of the displacement means 35. Therefore, the displacement of the cooling cylinders 31 from the first reference position to the second reference position, or vice versa, occurs further to a rotation of the support structure 33 about the rotation axis 130. In the embodiments in FIGS. 1 to 4, for example, the cooling cylinders 31 reach the contact position with the plate 5 (i.e., the first reference position) further to a clockwise rotation (arrow W1) of the support structure 33 about the axis 130, while the non-contact position (i.e., the second reference position) it is reached further to a counter-clockwise rotation (arrow W2). On the contrary, in the embodiment in FIG. 6, the contact position is reached by means of a counter-clockwise rotation (arrow W1), while the non-contact position by means of a clockwise rotation (arrow W2).

In an alternative embodiment, not shown in the figures, the displacement between the reference positions could be caused by a rotation or a roto-translation of the cooling cylinders with respect to the support cylinder.

Figure 4:
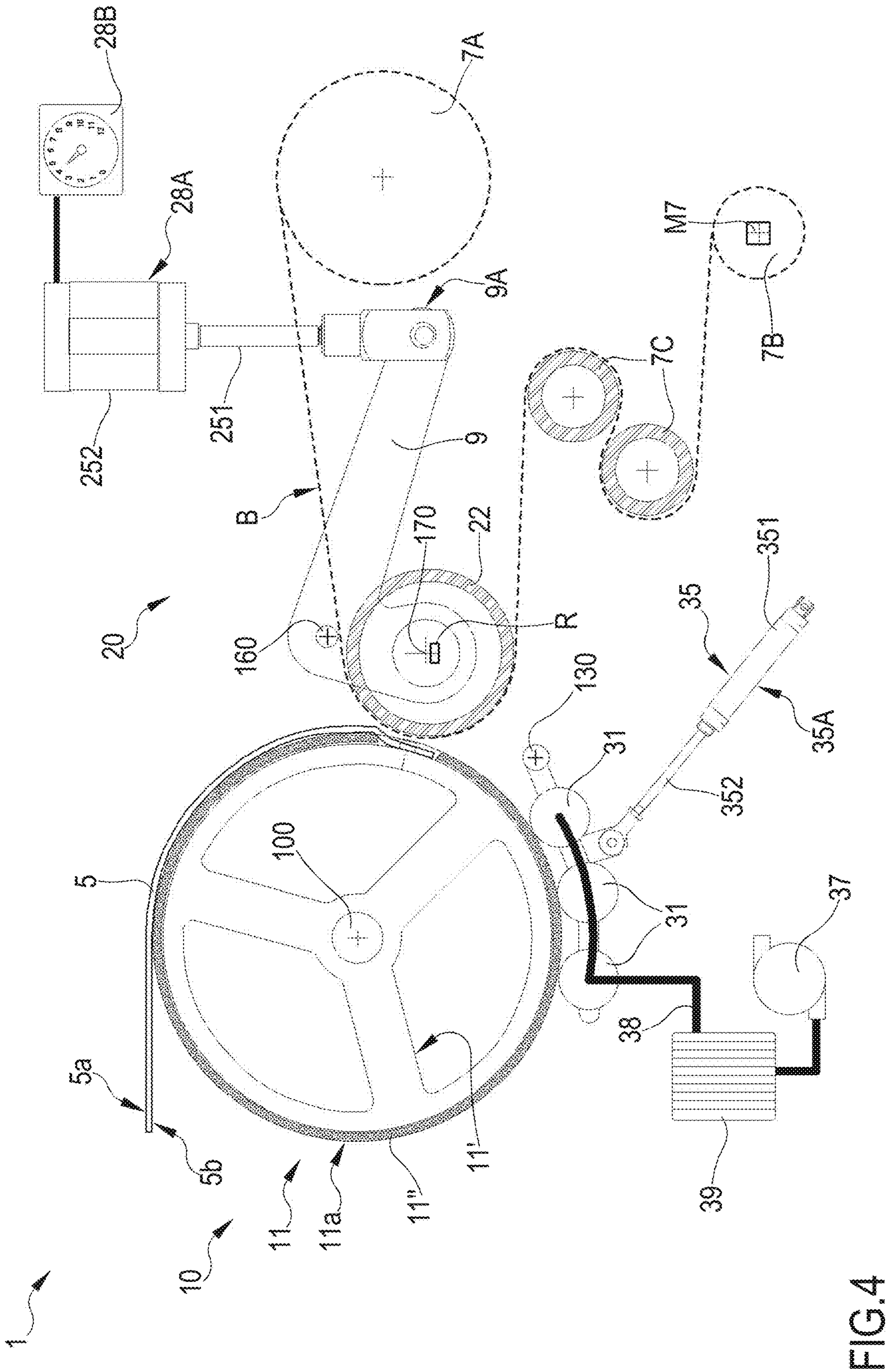
FIG. 4 is a schematic view of the apparatus of FIG. 3 in a second operating configuration.
Figure 5:
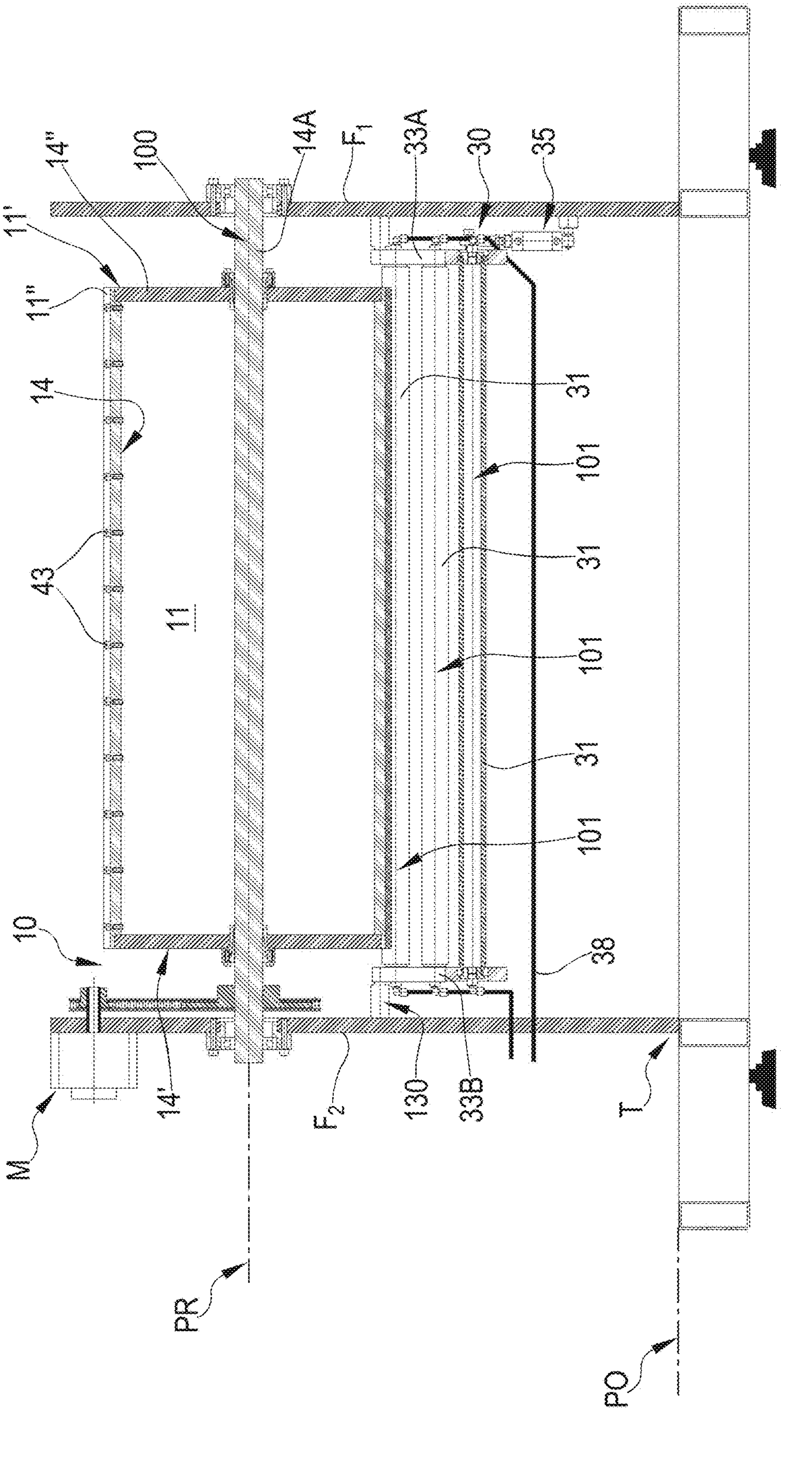
FIG. 5 is a schematic front view of the apparatus of FIG. 3.

FIG. 5 is a schematic view showing the arrangement of the moving assembly 10 and of the cooling assembly 30 frontally. This arrangement is substantially valid for each of the embodiments shown in FIGS. 1 to 4. With reference to FIG. 5, the apparatus 1 comprises a support frame T comprising two opposing sidewalls F1, F2 supporting the cylinder 10 close to its ends. The two sidewalls F1, F2 define a support plane PO for the apparatus 1. The support structure 33 is pivoted to each of the two sidewalls F1, F2 so as to rotate about the rotation axis 130 which is located at a lower height than the height of the rotation axis of the cylinder 10, wherein these heights are considered with respect to the support plane PO. Therefore, the operating assembly 10 acts on the plate within a semi-space between the support plane PO and a reference plane PR (also indicated in FIGS. 1 to 3) parallel to the support plane passing through the rotation axis 101 of the cylinder 10.

The support structure 33 comprises a first part 33A and a second part 33B which support the cooling cylinders 31 close to their ends. Each part 33A, 33B is operatively located in a position adjacent to a corresponding sidewall F1, F2 of the support frame T of the apparatus 1.

Preferably, the displacement means 35 of the cooling assembly 30 comprise at least one actuator, preferably of hydraulic type. As shown in FIG. 5, the rod of such an actuator 35A is connected to one of the two parts (in the present case, the first part 33A) of the support structure 33, whereas the associated cylinder is fixed to the sidewall (in the present case, the first sidewall F1) adjacent to the part of the support structure 33 to which the rod is connected. In an alternative embodiment, two actuators 35A, 35B could be present, each operatively connected to a corresponding one of the parts 33A, 33B of the support structure 33. Therefore, each actuator 35A, 35B would act in a position close to a corresponding sidewall F1, F2. Alternatively, a more actuators could also be provided, longitudinally spaced so as to spread the pushing action on the whole length of the support structure 33.

According to an embodiment, shown in the figures, the temperature value of the outer surface of the cooling cylinders 31 is maintained below a predetermined value, or in a range of predetermined values, by the forced circulation of a cooling fluid, for example water, through the cylinders.

In this regard, as schematically shown in FIGS. 2, 3, 4 and 5, preferably the cooling assembly 30 comprises a circulation line 38 of the cooling fluid along which a circulation pump 37 is arranged. FIG. 5 shows the circulation line 38 of the cooling fluid which is configured so that the cooling cylinders 31 are cooled in parallel, preferably over the whole longitudinal extension thereof, so as to keep all the cylinders at the same temperature.

The cooling assembly 30 further comprises a thermal conditioning machine 39 arranged along the circulation line 38 to condition (in particular to cool) the cooling fluid before it enters the cooling cylinders 31. Preferably, the thermal conditioning machine 39 is of the water/water type, but it could also be of the air/water type.

Preferably, but not exclusively, the circulation pump 37 is operatively arranged upstream of the thermal conditioning machine 39 with respect to the flow direction of the cooling fluid in the circulation line 38. According to a preferred operating mode, the thermal conditioning machine 39 and the circulation pump 38 are maintained constantly activated even at the end of the development process of a plate 5 and hence in the idle time before loading and processing another plate.

With reference again to the embodiments in FIGS. 1 to 4, as mentioned above the plate 5 is made integral with the support surface 11*a* defined by the moving assembly using connection means. Preferably, the connection means comprise a pin bar 41 which, according to a known principle, is connected to the plate 5 by means of through holes formed in the plate in a position close to an edge thereof.

Figure 2:
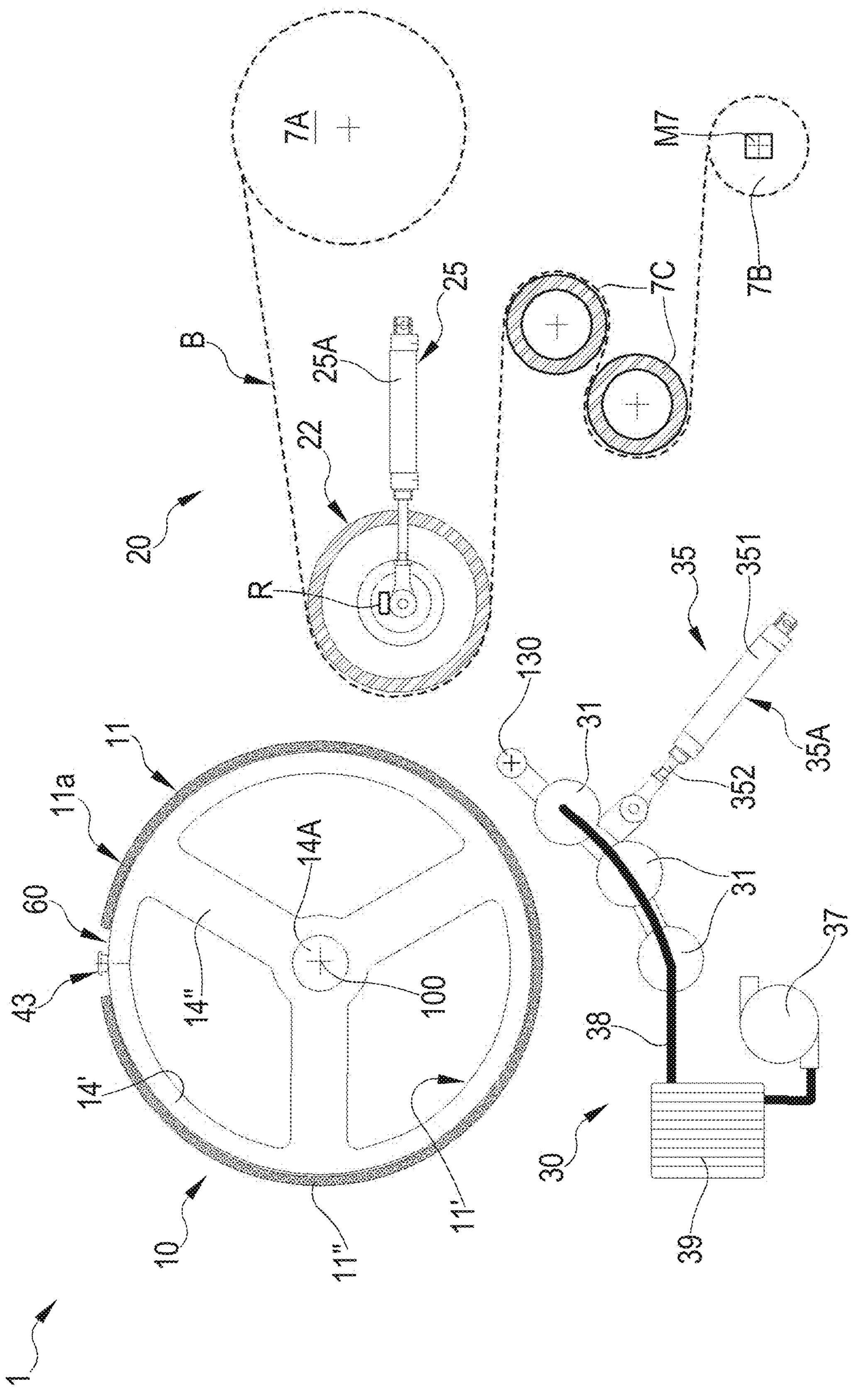
FIG. 2 is a schematic view of a second embodiment of a thermal development apparatus of a flexographic plate according to the invention.

In the embodiments in FIGS. 1 to 4, the pin bar 41 is advantageously connected to the outer surface 18 of the cylindrical body 11' of the cylinder 11 at a cutoff region 60 in the cover layer 11" that extends over the whole longitudinal length of the cylinder 11 (see FIG. 2). In other words, a portion of the outer surface 18 (indicated in FIG. 1) of the cylindrical body 11', to which the pin bar 41 is fixed, is not covered by the cover layer 11". In a cross-sectional plane orthogonal to the axis of the cylinder, the break region 60 appears as a circular sector region around the cylindrical body 11'.

Further to the connection of the pin bar 41 to the outer surface 18 of the cylindrical body 11', the tips of the pins 43 are located at a radial distance R1 (measured from the rotation axis of the cylinder 11) smaller than, or at most equal to, the radius R2 of the circumference along which the outermost surface (corresponding to the support surface 11*a*) of the cover layer 11" develops (the radial distance R1 and the radius R2 being considered in a cross-sectional plane orthogonal to the rotation axis 100 of the cylinder 11).

The possibility of making the plate integral with the support surface of the moving assembly by means of other methods with respect to the one described above also falls within the scope of the present invention. In this regard, according to a less preferred embodiment, the pin bar could be fixed directly on top of the cover layer.

Figure 6:
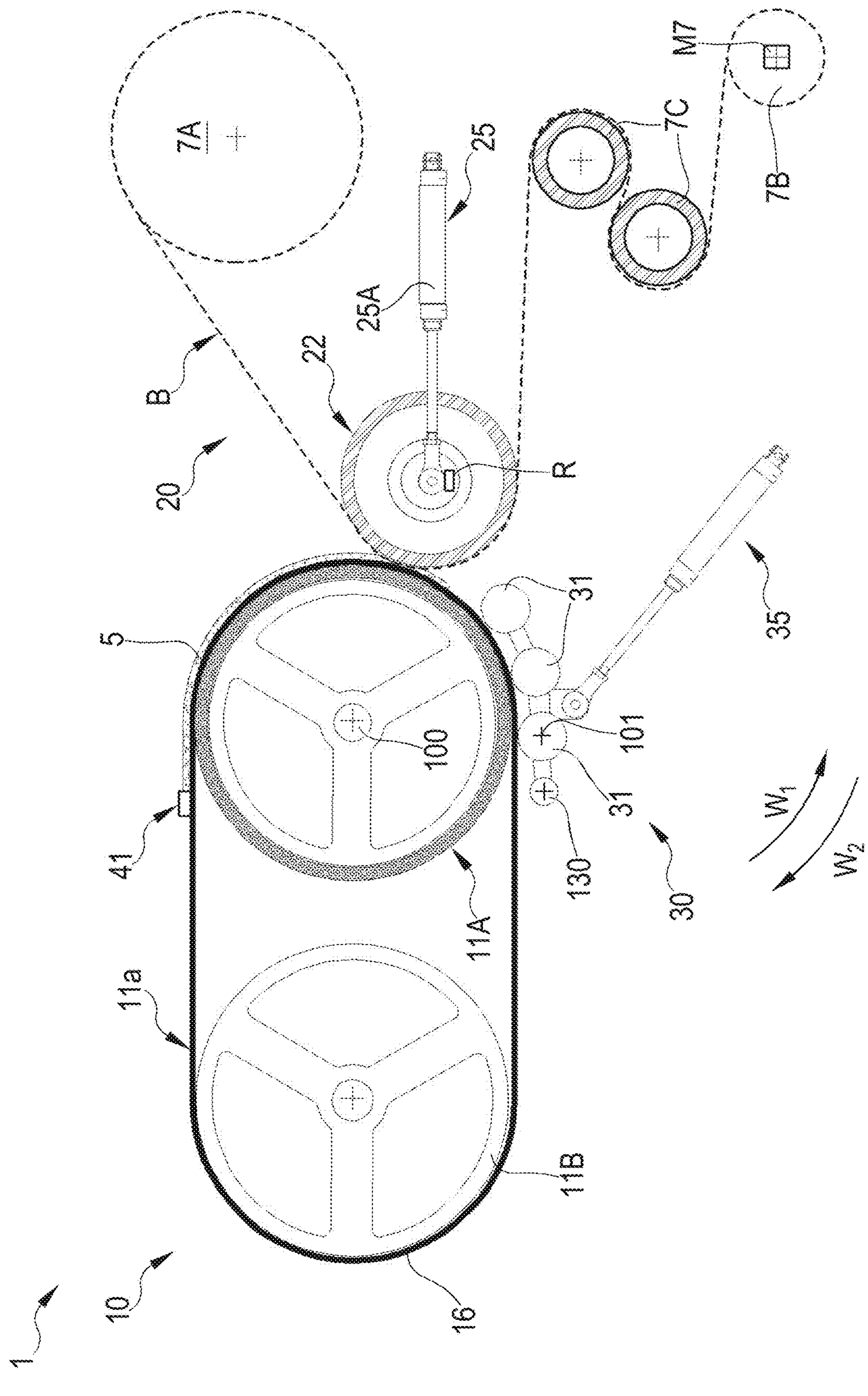
FIG. 6 is a schematic view of a further embodiment of a thermal development apparatus of a flexographic plate according to the invention.

The embodiment shown in FIG. 6 differs from each of the other embodiments by a different configuration of the moving assembly 10, which has a conveyor configuration comprising a pair of cylinders 11A-11B, at least one of which (11A) is motorized, and a belt 16 made to rotate by the cylinders 11A-11B, wherein the belt 16 defines the support surface 11*a* for the plate 5. FIG. 6 shows how the present invention is not dependent on a specific configuration of the moving assembly 10. In fact, also in the case of a conveyor configuration, the apparatus 1 can be provided with the cooling assembly 30 having the technical features and the advantages already described above.

Moreover, it is also noted that mounting and use of the cooling assembly 30 is not dependent on the possible configuration of the development operating assembly 20. In this regard, in the embodiments shown, the feeding means 7A, 7B, 7C of the operating assembly 20 comprise a feeding cylinder 7A of the absorbent material B, a collecting cylinder 7B of the used absorbent material and a pair of tensioning cylinders 7C to keep the material at the proper operating tension, according to widely known principles. As schematically shown, the cylinders 7A, 7B, 7C rotate about rotation axes substantially parallel to the rotation axis of the cylinder 11 or of the support cylinders 11A-11B of the moving assembly 10. At least the collecting cylinder 7B is rotated by a motor M7.

The possibility of configuring the feeding means differently, provided that they are configured to be functionally suitable to cooperate with the development operating assembly 20, also falls within the scope of embodiments as disclosed herein.

In the embodiments shown in the figures, the heating means 22, R have a known configuration that provides for the use of a heating cylinder 22 on which the absorbent material B is partially wound. The heating cylinder 22 consists of a body made of metal material heated by at least one electrical resistor R extending through the inside of the body.

Again with reference to the embodiments in FIGS. 1, 2 and 6, the contact means comprise a pushing unit 25 acting on the heating cylinder 22 so as to apply a constant push thereon. The pushing unit 25 is configured as a pair of hydraulic actuators 25A acting on the cylinder 22 at opposite ends thereof. In this embodiment, according to a known principle, the distance between the heating cylinder 22 and the outer surface 5*a* of the plate 5 is set and adjusted using of mechanical means (not represented in the figures). Overall, the action of the pushing unit 25 and of these mechanical means helps to define how the contact between the absorbent material B and the outer surface 5*a* of the plate takes place.

Figure 3:
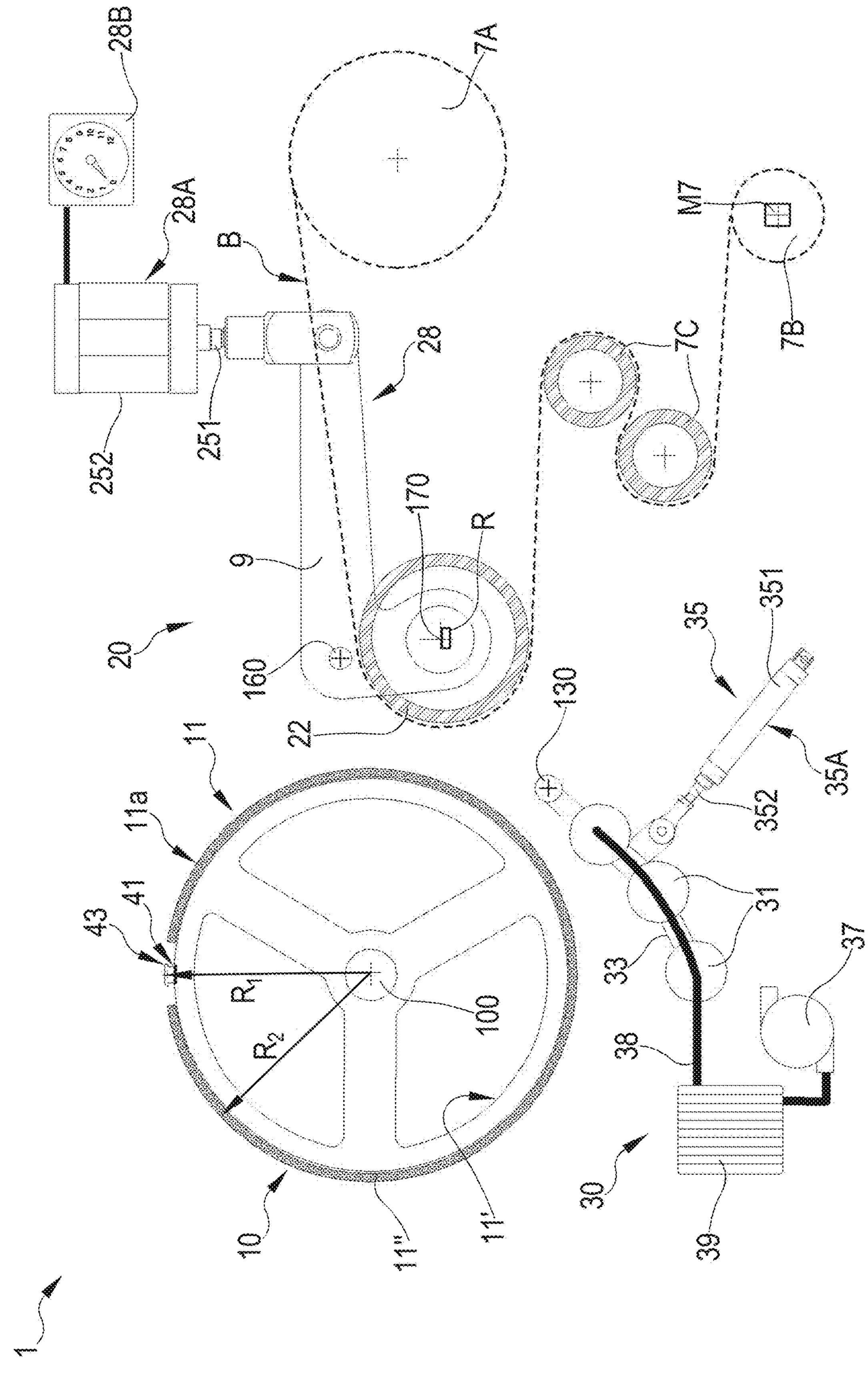
FIG. 3 is a schematic side view of a third embodiment of a thermal development apparatus of a flexographic plate according to the invention in a first operating configuration.

The embodiment shown in FIGS. 3 and 4 schematically shows an embodiment of the operating assembly 20 that differs from the embodiment shown in FIGS. 1, 2 and 6 substantially due to a different configuration of the pushing unit (indicated by reference 28 in FIG. 3). More precisely, in the embodiment of FIGS. 3 and 4, the pushing unit 28 comprises a pair of pneumatic actuators 28A, each comprising a cylinder 252 and a rod 251 projecting therefrom which is directly or indirectly connected to the heating cylinder 22 to allow a movement according to a predetermined trajectory. More precisely, for each actuator 28A, the corresponding rod 251 is directly or indirectly connected to the heating cylinder 22 close to an end thereof.

Preferably, the two actuators 28A are connected indirectly to the heating cylinder 22 by a pair of connection levers 9 (or levers 9) each of which is hinged to one of the sidewalls F1, F2 of the support frame T, so as to rotate about a common rotation axis 160. For each lever 9, a first end 9A is hinged to the end of the rod 251 of the corresponding actuator 25A, whereas the second end 9B is rotatably connected to the heating cylinder 22 close to an end thereof. More precisely, the two connection levers 9 support the heating cylinder 22 at the ends thereof. The axis 170 of the heating cylinder 22 is hence parallel to the common rotation axis 160 of the two levers 9.

As shown in FIGS. 3 and 4, the two levers 9 have a substantially L-shaped configuration. Therefore, further to the actuation the actuators 28A, the heating cylinder 22 is moved by the levers 9 along a circular trajectory whose centre of rotation coincides with the common rotation axis 160 of the levers.

In this embodiment, the pushing unit 28 comprises a pressure regulator 28B for adjusting the pressure applied by the rod 251 of each actuator 25A onto the heating roller 22 and, accordingly, the pressure applied by the latter acts onto the plate 5. In particular, the pressure regulator 28B allows the pressure to be varied gradually, by increasing or decreasing it as required, during the movement of the plate 5. The pressure can be varied at each passage of the plate 5 or after a predetermined number of passages. The Applicant observed that the pushing unit 28 described above, and in particular the use of the pressure regulator 28B, represents a simpler and less expensive solution as compared to known solutions. In particular, this solution avoids the use of hydraulic cylinders and mechanical adjustment means typically used to adjust the distance between the heating roller and the plate 5.

With reference to the embodiment shown in FIGS. 3 and 4, an embodiment of the operating method of the device is described below.

With reference to FIG. 3, in the absence of the plate 5, the cooling cylinders 31 of the cooling assembly 30 take up the second reference position, i.e., are located at a distance to the cylinder 11 intended to support the plate 5. At the same time, the pushing unit 25 of the heating cylinder 22 is deactivated, i.e., the latter is located in an idle position relatively away from the support cylinder 10.

The thermal conditioning machine 39 of the cooling assembly 30 is activated before the plate 5 is moved by the support cylinder 11, so as to bring the temperature of the outer surface of the cylinders below a predetermined value or predetermined range of values beforehand. For a similar purpose, the heating cylinder 22 is also heated, by activating the electrical resistor(s) R, before the plate 5 is moved.

After connecting the plate 5 to the pin bar 41 fixed to the cylinder 11, the pushing unit 28 of the operating assembly 20 is activated. The two actuators 28A act on the corresponding levers 9 so as to move the heating cylinder 22 into the correct operating position. Being the actuators 28A pneumatic, this operating position will be determined by the pressure of the air entering the cylinders 252 of the actuators.

Simultaneously or not to activation of the pushing unit 25, the displacement means 35 of the cooling assembly 30 are also activated so as to take the cooling cylinders 31 into the first reference position defined above, i.e., the position where they can contact the outer surface 5a of the plate 5.

After connecting the plate 5 to the cylinder 11, according to the preferred connection method described above, the motor M intended for rotating the cylinder 11 and the motor M7 intended for rotating the collecting cylinder 7B are operated so as to move the plate 5 and feed the absorbent material B, respectively.

By means of the heating cylinder 22, the non-crosslinked polymer/monomer is melted and removed from the outer surface 5a of the heating roller 22, due to the action of the absorbent material B fed around the same heating cylinder 22. Further to the movement of the plate 5, the surface portion thereof from which the polymer or monomer has just been removed contacts the cooling cylinders 31 of the moving assembly 30. In this way, the diffusion of heat within the plate 5 is counteracted, and consequently a temperature increase in the base layer is also effectively counteracted.

The operation described above is preferably automated by the use of a control unit (not indicated in the figures) through which it is possible to control the motor M for moving the cylinder 11, the motor M7 for motorizing the collecting cylinder 7B of the feeding means, the displacement means 35 of the cooling assembly 30, and the pushing unit 28 (in particular the actuators 28A) of the development assembly 20. In particular, through the same control unit, it is possible to control the thermal conditioning machine 39 and/or activation/deactivation of the electrical resistor(s) for heating the heating roller 22. Moreover, through the same control unit it is possible to control the pressure regulator 28B and hence to vary (i.e., increase or decrease) as required (for example based on the type of plate and/or the type of design) the pressure with which the actuators 25A act on the heating cylinder 22, i.e., to vary the position of the latter relative to the plate 5.

The solutions described above allow the set aims and objects to be fully achieved. In particular, an embodiment of a thermal development apparatus as disclosed herein allows the final quality of the plate to be increased, in particular preventing, or in any case effectively counteracting, possible deformations/distortions to which the base layer of the plate could be subjected because of the heating required for thermal development of the plate.

As mentioned above, the use of a cooling assembly as disclosed herein may be independent of the configuration of the moving assembly and of the development operating assembly. The latter can also have configurations different from those described and shown in the figures, in particular configurations already known to the person skilled in the art.

What is claimed is:

1. A thermal development apparatus for removing non-crosslinked polymer or monomer from a first surface of a flexographic plate, wherein the apparatus comprises:

- a moving assembly defining a support surface for a second surface of the flexographic plate opposite the first surface, wherein the moving assembly is configured to move the flexographic plate along a predetermined trajectory;
- a development operating assembly configured to apply an absorbent material to the first surface of the flexographic plate during the movement thereof, wherein the development operating unit comprises:
- feeding means of the absorbent material;
- heating means for heating the first surface of the flexographic plate to a temperature sufficient to melt at least a portion of the non-crosslinked polymer/monomer;
- contact means for causing a contact between the absorbent material and the first surface of the flexographic plate to allow the melted polymer/monomer to be absorbed by the absorbent material; and
- a cooling assembly for cooling the flexographic plate at a second operating position downstream of a first operating position at which the absorbent material contacts the first surface of the flexographic plate, wherein the first and second operating positions are considered with respect to the predetermined trajectory along which the flexographic plate is moved;
- wherein the cooling assembly comprises:
  - at least one cooling element movable between a first reference position and a second reference position corresponding, respectively, to a contact and non-contact condition with the first surface of the flexographic plate; and
  - displacement means for moving, directly or indirectly, the at least one cooling element between the first and second reference positions.

2. The apparatus of claim 1, wherein the at least one cooling element is cooled by a forced circulation of a cooling fluid therewithin.

3. The apparatus of claim 1, wherein the cooling assembly comprises a plurality of cooling cylinders having parallel axes and a support structure that rotatably supports the cooling cylinders, wherein the displacement means are operatively connected to and act on the support structure to move the cooling cylinders between the reference positions.

4. The apparatus of claim 3, wherein the moving assembly comprises at least one motorized support cylinder rotatable about a first rotation axis and wherein the support structure is rotatable by means of the displacement means about a second rotation axis parallel to the first rotation axis.

5. The apparatus of claim 4, wherein:

the support cylinder is supported at its ends by two opposing sidewalls of a support frame that defines a support plane for the apparatus;

the support structure comprises a first part and a second part supporting the cooling cylinders close to opposite ends thereof;

each of the first and second parts is located adjacent to a corresponding one of the sidewalls; and the displacement means comprise at least one actuator operatively connected to a corresponding one of the parts of the support structure.

6. The apparatus of claim 5, wherein the second rotation axis of the support structure is arranged at a second height lower than a first height at which the first rotation axis of the support cylinder is located, wherein the first and second heights are considered with respect to the support plane.

7. The apparatus of claim 3, wherein the cooling assembly comprises a circulation line for the cooling fluid along which a circulation pump is arranged, wherein the circulation line extends through each of the cooling cylinders.

8. The apparatus of claim 7, wherein the cooling assembly comprises a thermal conditioning machine operatively arranged along the circulation line to condition the cooling fluid before the passage thereof through the cooling cylinders.

9. The apparatus of claim 8, wherein the cooling fluid is water and wherein the thermal conditioning machine is of a water/water type or of an air/water type.

10. The apparatus of claim 4, wherein the support cylinder comprises a cylindrical body and a cover layer that at least partially covers the cylindrical body, wherein the cylindrical body is internally hollow.

* * * * *